(12) United States Patent
Enna et al.

(10) Patent No.: US 6,395,083 B2
(45) Date of Patent: May 28, 2002

(54) METHOD FOR PRODUCING A CEMENT ADMIXTURE, CONCRETE AND FLUORINE-CONTAINING OXYALKYLENE COMPOUNDS

(75) Inventors: Genichirou Enna; Hiroki Fukuda; Yoshihiro Ohtsuka, all of Kawasaki (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/793,700

(22) Filed: Feb. 27, 2001

Related U.S. Application Data

(62) Division of application No. 09/308,640, filed as application No. PCT/JP97/04335 on Nov. 27, 1997.

(51) Int. Cl.$^7$ .......................... C04B 28/04; C07C 43/11; C07C 43/18; C07C 319/00
(52) U.S. Cl. ....................... 106/724; 106/714; 106/734; 568/606; 568/615; 568/45; 524/5
(58) Field of Search .......................... 568/45, 602, 615; 106/714, 724, 734; 524/5

(56) References Cited

U.S. PATENT DOCUMENTS

| 2,723,999 A | 11/1955 | Cowen et al. |
| 4,680,358 A | 7/1987 | Yu |

FOREIGN PATENT DOCUMENTS

| DE | 2405042 A1 | * | 8/1975 |
| JP | 52006799 A2 | * | 1/1977 |
| JP | 53031582 A2 | * | 3/1978 |
| JP | 63168642 A2 | * | 7/1988 |
| JP | 2-227426 |  | 9/1990 |
| JP | 3-290430 |  | 12/1991 |

* cited by examiner

Primary Examiner—Sreeni Padmanabhan
Assistant Examiner—Sikarl A. Witherspoon
(74) Attorney, Agent, or Firm—Oblon, Spivak, McClelland, Maier & Neustadt, P.C.

(57) ABSTRACT

The present invention is the following invention which provides a cement admixture which satisfies fluidity of fresh concrete and high strength of the hardened product of concrete simultaneously.

Namely, the present invention resides in a cement admixture which is a mixture of fluorine-containing compounds represented by the formula (1):

$$R^f 13\ Q^1\text{—}O\text{—}(A^1\text{—}O)_k\text{—}R^1 \qquad (1)$$

wherein $R^f$ is a $C_{1-22}$ polyfluoroaliphatic hydrocarbon group which may contain ethereal oxygen atoms or thioethereal sulfur atoms, $Q^1$ is a $C_{1-5}$ linear or branched alkylene group, k is an integer of from 1 to 100, $A^1$ is a $C_{2-4}$ linear alkylene group or a group having at least one hydrogen atom of said alkylene group substituted by a hydrocarbon group which may contain ethereal oxygen atoms, provided that when k is from 2 to 100, the plurality of $A^1$ may be the same or different, and $R^1$ is a hydrogen atom, a $C_{1-18}$ hydrocarbon group or a $C_{1-18}$ acyl group, said mixture having a ratio of the weight average molecular weight ($M_w$) to the number average molecular weight ($M_n$) (i.e. $M_w/M_n$) of at least 1.1, and concrete which contains said cement admixture.

16 Claims, No Drawings

METHOD FOR PRODUCING A CEMENT ADMIXTURE, CONCRETE AND FLUORINE-CONTAINING OXYALKYLENE COMPOUNDS

This application is a Division of application Ser. No. 09/308,640 filed on May 28, 1999, pending, which was originally filed as International Application No. PCT/JP97/04335, filed on Nov. 27, 1997.

TECHNICAL FIELD

The present invention relates to a cement admixture which comprises specific fluorine-containing compounds and concrete containing said cement admixture. The present invention further relates to a method for producing specific fluorine-containing compounds. The present invention still further relates to a novel surface active agent.

BACKGROUND ART

In order to improve the strength of the hardened product of concrete, it is most effective to reduce the water content of concrete. However, there are drawbacks that if the water content is reduced, fluidity of fresh concrete may decrease, whereby workability at the work site may significantly deteriorate.

In recent years, along with the increase in high-rise buildings, labor-saving is required, and fluidity of fresh concrete is thereby required. Simultaneously, the hardened product of concrete is required to have high strength including anti-earthquake property. Accordingly, concrete is required to satisfy both of the two performances which are in an antinomic relation to each other.

The following methods have been proposed for such requirements.

(1) A method to add, as an air-entraining agent (AE agent), a compound having terminal hydroxyl groups of (polyoxyethylene)aryl ether substituted by alkoxy groups to concrete to improve workability and freezing damage property, and to add an emulsion stabilizer for latex to prevent cracks.

(2) A method to use a block copolymer of oxyethylene and oxypropylene as a water reducing agent and a dispersing agent for concrete.

(3) A method to use an addition product of higher alcohol alkylene oxide, as an air-entraining agent and an emulsion stabilizer for latex.

(4) A method to use polyoxyalkylene glycol as a dispersing agent for e.g. asbestos or glass wool, which are fibers to be incorporated in concrete, and a method to use polyoxyalkylene glycol together with a cement dispersing agent such as lignin sulfonic acid, to further raise dispersibility of the fibers.

Further, the following methods have been proposed to reduce the shrink of the hardened product of concrete.

(5) A method to add an alkylene oxide compound to concrete (JP-A-2-1789).

(6) A method to add a compound having a higher carboxylic acid and alkylene oxide added thereto, to concrete (JP-A-5-70196, JP-A-3-290342).

Further, the following method has been proposed to obtain high hardness.

(7) A method to add a surface active agent containing an anionic surface active agent which comprises a hydrocarbon compound as a main component, to concrete.

Further, the following methods have been proposed to prevent reduction in fluidity of concrete when the water content is reduced.

(8) A method to add a surface active agent of fluorine type which comprises a compound having e.g. a sulfonyl bond, an ester bond or an amide bond, inserted between a perfluoroalkyl group and an oxyalkylene group (JP-A-7-17752).

(9) A method to use a surface active agent of hydrocarbon type together with the surface active agent of fluorine type as mentioned in (8) (JP-A-2-1789, JP-A-1-53215).

On the other hand, as the method for producing a compound containing a perfluoroalkyl group and an oxyalkylene group, the following methods have been proposed.

(10) A method in which a compound having a perfluoroalkyl group and a hydroxyl group connected therewith by means of an ethylene group (hereinafter referred to as perfluoroalkyl ethanol) is used as an initiator, and when ring opening polymerization of the alkylene oxide therewith is conducted, a three way catalyst made of $NaI/I_2/NaBH_4$ is used (WO95-35272).

(11) A method to react a tosylate of polyalkylene glycol with a perfluoroalkyl ethanol (JP-B-7-103059).

(12) A method in which perfluoroalkyl ethanol is used as an initiator, and when ring opening polymerization of the alkylene oxide compound therewith is conducted, a double metal cyanide complex is used as a catalyst (JP-A-3-290430).

However, there are following drawbacks in the above-mentioned proposals.

In the methods (1) to (4), both performances of strength after concrete is hardened and fluidity of fresh concrete are inadequate.

In proposals (5) and (6), in the case where the water content is reduced, a drawback is confirmed such that fluidity of fresh concrete decreases.

In the method (7), in order to obtain performance, it is required to add a large amount of surface active agent, and even if a large amount of surface active agent is added, strength and fluidity are inadequate.

In the methods (8) and (9), when the surface active agent is added to concrete, a problem of foaming phenomenon (a phenomenon such that foams are likely to foam, and formed foams hardly disappear) is confirmed. Further, concrete is likely to involve air during mixing, whereby apparent density after hardened decreases, and as a result, a problem such that the strength of the hardened product of concrete decreases is confirmed. Particularly in the case of employing a conventional fluorine-containing surface active agent having an amide bond or an ester bond between a perfluoroalkyl group and an oxyalkylene group, foaming phenomenon is significant, and depending upon the conditions of use of concrete, a problem such that the fluorine-containing surface active agent is hydrolyzed is confirmed. Further, among fluorine-containing surface active agents as described in the above references, some are hardly available practically, and some are extremely expensive even if they are available, whereby some of the fluorine-containing surface active agents can not be used practically.

Further, there are following problems in the above-mentioned method.

In the method (10), a special catalyst is used, and the control of the reaction is difficult. Further, it is disadvantageous in view of cost, and the method can not be industrially used practically. Further, the foaming phenomenon is confirmed.

In the method (11), the side reaction occurs, whereby the yield of the desired compound will be extremely low.

In the method (12), purification after the reaction takes a lot of time and labor. Further, in the case where the metal complex remains in the compound obtained by said method, performance as a cement admixture tends to decrease.

In each method (10) to (12), if it is attempted to change the structure of the initiator or to change the kind of the oxyalkylene group, the reaction is less likely to proceed, and such methods can not be used widely.

DISCLOSURE OF THE INVENTION

The present inventors have studied on a cement admixture, i.e. compounds having an excellent performance as an additive to be added to concrete for the purpose of improving fluidity, and found a mixture of the following fluorine-containing compounds. Further, they have found a method for effectively producing specific fluorine-containing compounds among said compounds, and a novel surface active agent.

Namely, the present invention provides a cement admixture which is a mixture of fluorine-containing compounds represented by the formula (1), and which is fluorine-containing compounds having a ratio of the weight average molecular weight ($M_w$) to the number average molecular weight ($M_n$) (i.e. $M_w/M_n$) of at least 1.1:

(1)

wherein $R^f$ is a $C_{1-22}$ polyfluoroaliphatic hydrocarbon group which may contain ethereal oxygen atoms or thioethereal sulfur atoms, $Q^1$ is a $C_{1-5}$ linear or branched alkylene group, k is an integer of from 1 to 100, $A^1$ is a $C_{2-4}$ linear alkylene group or a group having at least one hydrogen atom of said alkylene group substituted by a hydrocarbon group which may contain ethereal oxygen atoms, provided that when k is from 2 to 100, the plurality of $A^1$ may be the same or different, and $R^1$ is a hydrogen atom, a $C_{1-18}$ hydrocarbon group or a $C_{1-18}$ acyl group, concrete which contains the cement admixture, a method for producing fluorine-containing oxyalkylene compounds and a novel surface active agent.

The mixture having a ratio of the weight average molecular weight ($M_w$) to the number average molecular weight ($M_n$) ($M_w/M_n$) of at least 1.1 of the present invention, is a mixture of fluorine-containing compounds represented by the formula (1). Hereinafter "the fluorine-containing compound represented by the formula (1)" is referred to as "fluorine-containing compound (formula (1))", and "the mixture of the fluorine-containing compounds (formula (1)) having a ratio of the weight average molecular weight ($M_w$) to the number average molecular weight ($M_n$) ($M_w/M_n$) of at least 1.1" is referred to as "fluorine-containing compounds (mixture)".

"The hydrocarbon group" in the present specification basically means a hydrocarbon group comprising only carbon atoms and hydrogen atoms. Only when it is specified that ethereal oxygen atoms may be contained or thioethereal sulfur atoms may be contained, said hydrocarbon group may contain atoms besides carbons atoms and hydrogen atoms. "The hydrocarbon group" refers to both "aliphatic hydrocarbon group" and "aromatic hydrocarbon group". As the aliphatic hydrocarbon group, an alkyl group and an alkenyl group are preferred. Further, at least one hydrogen atom of the aliphatic hydrocarbon group may be substituted by an aromatic hydrocarbon group. A benzyl group may, for example, be mentioned.

Further, as the aromatic hydrocarbon group, a phenyl group is preferred.

$R^f$ in the compound represented by the formula (1) of the present invention means a $C_{1-22}$ polyfluoroaliphatic hydrocarbon group which may contain ethereal oxygen atoms or thioethereal sulfur atoms. "The polyfluoroaliphatic hydrocarbon group which may contain ethereal oxygen atoms or thioethereal sulfur atoms" is hereinafter referred to as "$R^f$ group". The $R^f$ group means a group having at least two hydrogen atoms in the aliphatic hydrocarbon group substituted by fluorine atoms.

Further, $R^f$ group in the formula (1) is preferably a group having at least one fluorine atom bonded to the carbon atom adjacent to $Q^1$.

The number of carbons in $R^f$ group is from 1 to 22, preferably from 4 to 16, particularly preferably from 6 to 14. The higher the number of carbons in $R^f$ group, the lower surface tension and the lower volatility, such being favorable. However, too high number of carbons is unfavorable in view of cost.

$R^f$ group is preferably a polyfluoroalkyl group which may contain ethereal oxygen atoms or thioethereal sulfur atoms. Said polyfluoroalkyl group means a group having at least two hydrogen atoms of an alkyl group which may contain ethereal oxygen atoms or thioethereal sulfur atoms substituted by fluorine atoms. "A polyfluoroalkyl group which may contain ethereal oxygen atoms or thioethereal sulfur atoms" is hereinafter referred to as "$R^F$ group".

Among such $R^F$ groups, a polyfluoroalkyl group which does not contain ethereal oxygen atoms or thioethereal sulfur atoms, is preferred.

The number of carbons in $R^F$ group is preferably from 4 to 16, particularly preferably from 6 to 14.

Further, in the case where the number of fluorine atoms in $R^F$ group is represented by (number of fluorine atoms in $R^F$ group)/(number of hydrogen atoms in an alkyl group corresponding to $R^F$ group having the same number of carbons)×100 (%), it is preferably at least 60%, particularly preferably at least 80%. $R^F$ group is preferably linear or branched, and it is particularly preferably linear. In the case where it is branched, it is preferred that the branched part is a short chain having a number of carbons of from about 1 to about 3, and exists at the terminal part of $R^F$ group. Further, in the case where unsubstituted hydrogen atoms are contained in $R^F$ group, said hydrogen atoms may be substituted by chlorine atoms.

$R^f$ group is preferably a perfluoroalkyl group having substantially all hydrogen atoms of the alkyl group which may contain ethereal oxygen atoms or thioethereal sulfur atoms substituted by fluorine atoms. Among such perfluoroalkyl groups, a perfluoroalkyl group which does not contain ethereal oxygen atoms or thioethereal sulfur atoms is preferred.

The perfluoroalkyl group is preferably linear. The number of carbons of the perfluoroalkyl group is preferably from 1 to 18, more preferably from 4 to 16, particularly preferably from 6 to 14. Namely, the perfluoroalkyl group is preferably a linear group represented by $CF_3(CF_2)_m-$, wherein m is an integer of from 3 to 15.

As the specific example of the polyfluoroalkylene group, following examples are mentioned. In the following examples, groups corresponding to structural isomers of each group are included.

$C_4F_9-$ [structural isomers such as $CF_3(CF_2)_3-$, $(CF_3)_2CFCF_2-$, $(CF_3)_3C-$ and $CF_3CF_2CF(CF_3)-$], $C_5F_{11}-$ [structural isomers such as $CF_3(CF_2)_4-$, $(CF_3)_2CF(CF_2)_2-$, $(CF_3)_3CCF_2-$ and $CF_3(CF_2)_2CF(CF_3)-$], $C_8F_{17}-$, $C_{10}F_{21}$—, $C_{12}F_{25}$—, $C_{14}F_{29}$—, $C_{16}F_{33}$—, $C_{18}F_{37}$—, $(CF_3)_2CFC_sF_{2s}$—, wherein s is an integer of from 1 to 22, and $HC_tF_{2t}$—, wherein t is an integer of from 1 to 22.

Further, as the specific example of the polyfluoroalkyl group which contains ethereal oxygen atoms or thioethereal sulfur atoms, the following examples may be mentioned. Here, u means an integer of from 1 to 6, v means an integer of from 1 to 6, w means an integer of from 1 to 10, and m means an integer of from 1 to 6.

$CF_3(CF_2)_4OCF(CF_3)$—, $F[CF(CF_3)CF_2O]_uCF(CF_3)$—, $F(CF_2CF_2O)_vCF_2CF_2$—, $F(CF_2CF_2O)_wCF_2CF_2$— and $F[CF(CF_3)CF_2O]_mCF(CF_3)$—.

$CF_3(CF_2)_4SCF(CF_3)$—, $F[CF(CF_3)CF_2S]_uCF(CF_3)$—, $F(CF_2CF_2CF_2S)_vCF_2CF_2$—, $F(CF_2CF_2S)_wCF_2CF_2$— and $F[CF(CF_3)CF_2S]_mCF(CF_3)$—.

Further, the fluorine-containing compounds (mixture) of the present invention may be a mixture of at least two compounds having different numbers of carbons in $R^f$ group.

$Q^1$ in the fluorine-containing compound (formula (1)) is a $C_{1-5}$ linear or branched alkylene group. Namely, the fluorine-containing compound (formula (1)) is a compound having a linear connecting group such as a methylene group (—$CH_2$—), a dimethylene group (—$CH_2CH_2$—), a trimethylene group (—$CH_2CH_2CH_2$—), a tetramethylene group (—$CH_2CH_2CH_2CH_2$—) or a pentamethylene group (—$CH_2CH_2CH_2CH_2CH_2$—), inserted between the above-mentioned $R^f$ group and the oxyalkylene group, or a compound having a branched connecting group such as —$CH_2CH(CH_3)$— (propylene group), —$CH_2CH(CH_3)CH_2$—, $CH_2CH_2CH(CH_3)$—, —$CH_2CH_2CH(CH_3)CH_2$— or —$CH_2CH_2CH_2CH(CH_3)$—, inserted therebetween.

The connecting group is a connecting group which prevent foaming and involving of air, and a connecting group which contributes to imparting chemical stability to the compound, in the case where the fluorine-containing compound is used as a cement admixture.

$Q^1$ in the fluorine-containing compound (formula (1)) is preferably a $C_{2-5}$ linear or branched alkylene group, more preferably a $C_{3-4}$ linear or branched alkylene group. A compound having Q being a $C_3$ linear or branched alkylene group, is a compound which is excellent in chemical stability as dispersed in water, and is excellent in heat resistance. A compound having Q being a $C_4$ linear or branched alkylene group, is a compound which is excellent in chemical stability as dispersed in water, which is excellent in chemical stability also as dispersed in an alkaline aqueous solution, and which is excellent in heat resistance, and it is thereby most excellent compound to be used for a cement admixture.

k in the fluorine-containing compound (formula (1)) means an integer of from 1 to 100. It is preferably from 1 to 50, particularly preferably from 1 to 30. The fluorine-containing compounds (mixture) of the present invention are mixtures having at least two fluorine-containing compounds (formula (1)) having different values of k. When the average of k in the fluorine-containing compounds (mixture) is taken as $k_{av}$, $k_{av}$ is preferably within a range of from 3 to 50, more preferably within a range of from 5 to 30, particularly preferably within a range of from 5 to 15.

The fluorine-containing compounds (mixture) are required to have a ratio of the weight average molecular weight ($M_w$) and the number average molecular weight ($M_n$) ($M_w/M_n$) being at least 1.1. Compounds having $M_w/M_n$ of less than 1.1 do not have adequate effect to suppress foamability. $M_w/M_n$ is preferably at most 1.5, more preferably at most 1.3, most preferably at most 1.2.

As a factor to give the value of $M_w/M_n$ being at least 1.1 to the fluorine-containing compounds (mixture), it may be mentioned that the molecular weight of each compound is different with each other, since any of $R^f$, $Q^1$, $A^1$, k and $R^1$ in the formula (1) is different. In the present invention, preferred are fluorine-containing compounds (mixture) having $M_w/M_n$ of at least 1.1 due to difference in the value of k, or the value of k and $R^f$, among compounds.

Particularly fluorine-containing compounds (mixture) having $M_w/M_n$ of at last 1.1, due to broad distribution of the values of k of each compound in the mixture, are preferred. When the average value of k of said mixture is $k_{av}$, it is preferred that k of each compound in the mixture distributes to a wide range of from 0 to about 3 $k_{av}$. Although the mechanism is not clear, it is considered that the broadness of the distribution has some influences on suppression of foaming.

$A^1$ in the fluorine-containing compound (formula (1)) is a $C_{2-4}$ linear alkylene group or a group having at least one hydrogen atom of said alkylene group substituted by a hydrocarbon group which may contain ethereal oxygen atoms.

As the $C_{2-4}$ linear alkylene group, a dimethylene group, a trimethylene group or a tetramethylene group may be mentioned.

Further, $A^1$ may be a group having at least one hydrogen atom of the above-mentioned alkylene group substituted by a hydrocarbon group which may contain ethereal oxygen atoms.

As the hydrocarbon group which may contain ethereal oxygen atoms, a group such as an alkyl group, a phenyl group or a benzyl group, or a group having ethereal oxygen atoms inserted between the carbon-carbon linkage or at the terminals of such a group, may be mentioned.

As specific examples of $A^1$, the following examples may be mentioned. Ph means a phenyl group.

—$CH_2CH(CH_3)$—(propylene group), —$CH_2CH(CH_2CH_3)$—, —$CH(CH_3)CH(CH_3)$—, —$C(CH_3)_2CH_2$—, —$CH_2CH_2CH$ ($CH_3$)—, —$CH_2CH(CH_3)CH_2$—, —$CH_2CH[CH_2OCH_2CH(CH_2CH_3)(CH_2)_3CH_3]$—, —$CH_2CH(CH_2OPh)$— and —$CH_2CH(OPh)$—.

Among these, $A^1$ of the fluorine-containing compound (formula (1)) is preferably —$CH_2CH_2$—, —$CH_2CH(CH_3)$—, —$CH_2CH(CH_2CH_3)$— or —$CH_2CH_2CH_2CH_2$—.

Further, in the case where k is an integer of from 2 to 100, the plurality of $A^1$ in the fluorine-containing compound (formula (1)) may be the same or different. In the case where they are different, the number of kinds of $A^1$ is preferably 2 or 3, particularly preferably 2. The number of kinds of $A^1$ in the fluorine-containing compound (formula (1)) is preferably 1 or 2, and only one kind of ethylene groups or two kinds of ethylene groups and propylene groups, are particularly preferred.

The fluorine-containing compounds (mixture) of the present invention are preferably one having characteristic such that they can be dissolved or dispersed in water. Accordingly, it is preferred that an oxyethylene group which is a hydrophilic group is essential as the oxyalkylene group. Namely, it is preferred that the fluorine-containing compounds (mixture) contains the fluorine-containing compound (formula (1)) containing an oxyethylene group as ($A^1$—O) in the fluorine-containing compound (formula (1)).

In such a case, preferably at least 20%, particularly preferably at least 50%, more preferably at least 70%, by number, of the total oxyalkylene groups in the fluorine-containing compounds (mixture) are oxyethylene groups.

$R^1$ in the fluorine-containing compound (formula (1)) means a hydrogen atom, a $C_{1-18}$ hydrocarbon group or a $C_{1-18}$ acyl group.

In the case where $R^1$ is a $C_{1-18}$ hydrocarbon group, a $C_{1-5}$ hydrocarbon group is preferred, and a $C_{1-5}$ alkyl group is more preferred. $CH_3$—, $C_2H_5$—, linear or branched $C_3H_7$—, linear or branched $C_4H_9$ —, or linear or branched $C_5H_{11}$—, may be mentioned.

In the case where $R^1$ is a $C_{1-18}$ acyl group, as said acyl group, a $C_{1-10}$ acyl group is preferred, and a $C_{1-6}$ acyl group is particularly preferred. When $R_1$ is an acyl group, the fluorine-containing compound (formula (1)) has a structure containing an ester linkage at the terminal of the molecule, whereby the foamability is suppressed.

Further, when said acyl group is represented by $R^{10}CO$—, the $R^{10}$ part is preferably a $C_{1-17}$ alkyl group or alkenyl group.

As specific examples of the acyl group ($R^{10}CO$—), a group such as $CH_3CO$—, $CH_3CH_2CO$—, $CH_3(CH_2)_2CO$—, $CH_3(CH_2)_3CH(CH_2CH_3)CO$—, $CH_3(CH_2)_7CH=CH(CH_2)_7CO$— or $CH_3(CH_2)_{16}CO$—, may, for example, be mentioned.

Among these, a hydrogen atom or a methyl group is preferred as $R^1$, and hydrogen atom is particularly preferred.

As the fluorine-containing compound (formula (1)) of the present invention, a compound represented by the formula (1A) or the following formula (1B) is preferred. Here, the linkage of oxyethylene groups and oxypropylene groups in the formula (1B) may be block or random. In the case of the block chain, it is preferred that the polyoxypropylene group links to $R^f(CH_2)_3O$—, and the polyoxyethylene group links to said polyoxypropylene group.

Here, $R^f$ and $R^1$ in the formulae (1A) and (1B) are as defined for the formula (1), and the preferred modes are also as defined for the formula (1).

In the formula (1A), a is an integer of from 1 to 100, preferably from 1 to 50, particularly preferably from 3 to 30.

In the formula (1B), b is an integer of from 1 to 100, c is an integer of from 0 to 100, and $1 \leq b+c \leq 100$. Further, b is preferably an integer of from 1 to 30, c is preferably an integer of from 0 to 20, and preferably $1 \leq b+c \leq 30$. Further, preferably $0.2 \leq b/(b+c) \leq 1$, more preferably $0.5 \leq b/(b+c) \leq 1$, and particularly preferably $0.7 \leq b/(b+c) \leq 1$:

$$R^f(CH_2)_3O(CH_2CH_2O)_a R^1 \quad (1A)$$

$$R^f(CH_2)_3O\text{—}[CH(CH_3)CH_2O]_c(CH_2CH_2O)_b R^1 \quad (1B)$$

Specific examples of the fluorine-containing compound (formula (1)) include the following compounds. However, it is not restricted thereto. In the following formulae, the moiety corresponding to the perfluoroalkyl group may be linear or branched, and it is preferably linear. When at least two oxyalkylene moieties exist, the linkage may be block or random. The ($C_3H_6O$) moiety means an oxypropylene group, and is $[CH(CH_3)CH_2O]$ or $[CH_2CH(CH_3)O]$:

$C_6F_{13}(CH_2)_3O(CH_2CH_2O)_5H$,
$C_6F_{13}(CH_2)_3O(CH_2CH_2O)_8H$,
$C_7F_{15}(CH_2)_3O(CH_2CH_2O)_5H$,
$C_8F_{17}(CH_2)_3O(CH_2CH_2O)_5H$,
$C_8F_{17}(CH_2)_3O(CH_2CH_2O)_{10}H$,
$C_6F_{13}(CH_2)_3O(C_3H_6O)_5(CH_2CH_2O)_{10}H$,
$C_7F_{15}(CH_2)_3O(C_3H_6O)_5(CH_2CH_2O)_{10}H$,
$C_8F_{17}(CH_2)_3O(C_3H_6O)_5(CH_2CH_2O)_{10}H$,
$C_6F_{13}(CH_2)_3O(C_3H_6O)_4(CH_2CH_2O)_{15}H$,
$C_7F_{15}(CH_2)_3O(C_3H_6O)_4(CH_2CH_2O)_{15}H$,
$C_8F_{17}(CH_2)_3O(C_3H_6O)_4(CH_2CH_2O)_{15}H$,
$C_6F_{13}(CH_2)_3O(CH_2CH_2CH_2CH_2O)_5H$,
$C_6F_{13}(CH_2)_3O(CH_2CH_2CH_2CH_2O)_8H$,
$C_7F_{15}(CH_2)_3O(CH_2CH_2CH_2CH_2O)_5H$,
$C_8F_{17}(CH_2)_3O(CH_2CH_2CH_2CH_2O)_5H$,
$C_8F_{17}(CH_2)_3O(CH_2CH_2CH_2CH_2O)_{10}H$,
$C_8F_{17}(CH_2)_3O(CH_2CH_2CH_2CH_2O)_{20}H$,
$C_6F_{13}(CH_2)_3O(CH_2CH_2O)_5CH_3$,
$C_6F_{13}(CH_2)_3O(CH_2CH_2O)_8C_2H_5$,
$C_7F_{15}(CH_2)_3O(CH_2CH_2O)_5COCH_3$,
$C_8F_{17}(CH_2)_3O(CH_2CH_2O)_5COCH_3$,
$C_8F_{17}(CH_2)_3O(CH_2CH_2O)_{10}COCH_3$,
$C_6F_{13}(CH_2)_4O(CH_2CH_2O)_5H$,
$C_6F_{13}(CH_2)_4O(CH_2CH_2O)_8H$,
$C_7F_{15}(CH_2)_4O(CH_2CH_2O)_5H$,
$C_8F_{17}(CH_2)_4O(CH_2CH_2O)_5H$,
$C_8F_{17}(CH_2)_4O(CH_2CH_2O)_{10}H$,
$C_6F_{13}(CH_2)_4O(C_3H_6O)_5(CH_2CH_2O)_{10}H$,
$C_7F_{15}(CH_2)_4O(C_3H_6O)_5(CH_2CH_2O)_{10}H$,
$C_8F_{17}(CH_2)_4O(C_3H_6O)_5(CH_2CH_2O)_{10}H$,
$C_6F_{13}(CH_2)_4O(C_3H_6O)_4(CH_2CH_2O)_{15}H$,
$C_7F_{15}(CH_2)_4O(C_3H_6O)_4(CH_2CH_2O)_{15}H$,
$C_8F_{17}(CH_2)_4O(C_3H_6O)_4(CH_2CH_2O)_{15}H$,
$C_6F_{13}(CH_2)_4O(CH_2CH_2CH_2CH_2O)_5H$,
$C_6F_{13}(CH_2)_4O(CH_2CH_2CH_2CH_2O)_8H$,
$C_7F_{15}(CH_2)_4O(CH_2CH_2CH_2CH_2O)_5H$,
$C_8F_{17}(CH_2)_4O(CH_2CH_2CH_2CH_2O)_5H$,
$C_8F_{17}(CH_2)_4O(CH_2CH_2CH_2CH_2O)_{10}H$,
$C_8F_{17}(CH_2)_4O(CH_2CH_2CH_2CH_2O)_{20}H$,
$C_6F_{13}(CH_2)_4O(CH_2CH_2O)_5CH_3$,
$C_6F_{13}(CH_2)_4O(CH_2CH_2O)_8C_2H_5$,
$C_7F_{15}(CH_2)_4O(CH_2CH_2O)_5COCH_3$,
$C_8F_{17}(CH_2)_4O(CH_2CH_2O)_5COCH_3$,
$C_8F_{17}(CH_2)_4O(CH_2CH_2O)_{10}COCH_3$,
$C_6F_{13}(CH_2)_5O(CH_2CH_2O)_5H$,
$C_6F_{13}(CH_2)_5O(CH_2CH_2O)_8H$,
$C_7F_{15}(CH_2)_5O(CH_2CH_2O)_5H$,
$C_8F_{17}(CH_2)_5O(CH_2CH_2O)_5H$,
$C_8F_{17}(CH_2)_5O(CH_2CH_2O)_{10}H$,
$C_6F_{13}(CH_2)_5O(C_3H_6O)_5(CH_2CH_2O)_{10}H$,
$C_7F_{15}(CH_2)_5O(C_3H_6O)_5(CH_2CH_2O)_{10}H$,
$C_8F_{17}(CH_2)_5O(C_3H_6O)_5(CH_2CH_2O)_{10}H$,
$C_6F_{13}(CH_2)_5O(C_3H_6O)_4(CH_2CH_2O)_{15}H$,
$C_7F_{15}(CH_2)_5O(C_3H_6O)_4(CH_2CH_2O)_{15}H$,
$C_8F_{17}(CH_2)_5O(C_3H_6O)_4(CH_2CH_2O)_{15}H$,
$C_6F_{13}(CH_2)_5O(CH_2CH_2CH_2CH_2O)_5H$,
$C_6F_{13}(CH_2)_5O(CH_2CH_2CH_2CH_2O)_8H$,
$C_7F_{15}(CH_2)_5O(CH_2CH_2CH_2CH_2O)_5H$,
$C_8F_{17}(CH_2)_5O(CH_2CH_2CH_2CH_2O)_5H$,
$C_8F_{17}(CH_2)_5O(CH_2CH_2CH_2CH_2O)_{10}H$,
$C_8F_{17}(CH_2)_5O(CH_2CH_2CH_2CH_2O)_{20}H$,
$C_6F_{13}(CH_2)_5O(CH_2CH_2O)_5CH_3$,
$C_6F_{13}(CH_2)_5O(CH_2CH_2O)_8C_2H_5$,
$C_7F_{15}(CH_2)_5O(CH_2CH_2O)_5COCH_3$,
$C_8F_{17}(CH_2)_5O(CH_2CH_2O)_5COCH_3$,
$C_8F_{17}(CH_2)_5O(CH_2CH_2O)_{10}COCH_3$,
$C_6F_{13}(CH_2)_2CH(CH_3)O(CH_2CH_2O)_5H$,
$C_6F_{13}(CH_2)_2CH(CH_3)O(CH_2CH_2O)_8H$,
$C_7F_{15}(CH_2)_2CH(CH_3)O(CH_2CH_2O)_5H$,
$C_8F_{17}(CH_2)_2CH(CH_3)O(CH_2CH_2O)_5H$,
$C_8F_{17}(CH_2)_2CH(CH_3)O(CH_2CH_2O)_{10}H$,
$C_6F_{13}(CH_2)_2CH(CH_3)O(C_3H_6O)_5(CH_2CH_2O)_{10}H$,
$C_7F_{15}(CH_2)_2CH(CH_3)O(C_3H_6O)_5(CH_2CH_2O)_{10}H$,
$C_8F_{17}(CH_2)_2CH(CH_3)O(C_3H_6O)_5(CH_2CH_2O)_{10}H$,
$C_6F_{13}(CH_2)_2CH(CH_3)O(C_3H_6O)_4(CH_2CH_2O)_{15}H$,
$C_7F_{15}(CH_2)_2CH(CH_3)O(C_3H_6O)_4(CH_2CH_2O)_{15}H$,
$C_8F_{17}(CH_2)_2CH(CH_3)O(C_3H_6O)_4(CH_2CH_2O)_{15}H$,
$C_6F_{13}(CH_2)_2CH(CH_3)O(CH_2CH_2CH_2CH_2O)_5H$,
$C_6F_{13}(CH_2)_2CH(CH_3)O(CH_2CH_2CH_2CH_2O)_8H$,
$C_7F_{15}(CH_2)_2CH(CH_3)O(CH_2CH_2CH_2CH_2O)_5H$,
$C_8F_{17}(CH_2)_2CH(CH_3)O(CH_2CH_2CH_2CH_2O)_5H$,

C$_8$F$_{17}$(CH$_2$)$_2$CH(CH$_3$)O(CH$_2$CH$_2$CH$_2$CH$_2$O)$_{10}$H,
C$_8$F$_{17}$(CH$_2$)$_2$CH(CH$_3$)O(CH$_2$CH$_2$CH$_2$CH$_2$O)$_{20}$H,
C$_6$F$_{13}$(CH$_2$)$_2$CH(CH$_3$)O(CH$_2$CH$_2$O)$_5$CH$_3$,
C$_6$F$_{13}$(CH$_2$)$_2$CH(CH$_3$)O(CH$_2$CH$_2$O)$_8$C$_2$H$_5$,
C$_7$F$_{15}$(CH$_2$)$_2$CH(CH$_3$)O(CH$_2$CH$_2$O)$_5$COCH$_3$,
C$_8$F$_{17}$(CH$_2$)$_2$CH(CH$_3$)O(CH$_2$CH$_2$O)$_5$COCH$_3$ and
C$_8$F$_{17}$(CH$_2$)$_2$CH(CH$_3$)O(CH$_2$CH$_2$O)$_{10}$COCH$_3$.

Some of the fluorine-containing compounds (formula (1)) of the present invention may be produced by the above-mentioned known methods. However, the known production methods have drawbacks as mentioned above. Accordingly, for effective production, it is preferred to synthesize the fluorine-containing compound (formula (1)) by the following method.

The method mentioned hereinafter is a method suitably applied to the fluorine-containing compound (formula (1)) wherein Q$^1$ is a C$_{3-5}$ linear or branched alkylene group. In view of easiness to obtain materials, the method is particularly preferred for compounds of C$_{3-4}$ linear or branched alkylene group. Further, it is a particularly preferred method as a method for producing the fluorine-containing compounds for the cement admixture of the present invention.

The present invention also provides the following method for producing fluorine-containing compounds.

Namely, it is a method to obtain fluorine-containing oxyalkylene compounds represented by the formula (4), which comprises ring opening polymerization of at least one cyclic ether represented by the formula (3) in the presence of an acid catalyst and a fluorine-containing hydroxyl compound represented by the formula (2):

$$R^f\text{—}Q^2\text{—}OH \quad (2)$$

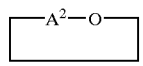   (3)

$$R^f\text{—}Q^2\text{—}O\text{—}(A^2\text{—}O)_k\text{—}H \quad (4)$$

wherein R$^f$ is a C$_{1-22}$ polyfluoroaliphatic hydrocarbon group which may contain ethereal oxygen atoms or thioethereal sulfur atoms, Q$^2$ is a C$_{3-5}$ linear or branched alkylene group, k is an integer of from 1 to 100, and A$^2$ is a C$_{2-4}$ linear alkylene group or a group having at least one hydrogen atom of said alkylene group substituted by a hydrocarbon group which may contain ethereal oxygen atoms.

Further, the fluorine-containing oxyalkylene compound (formula (4)) can be induced to the formula (5), as the case requires, by converting the terminal hydroxyl group to a R$^3$O— group, wherein R$^3$ is a C$_{1-18}$ hydrocarbon group or a C$_{1-18}$ acyl group:

$$R^f\text{—}Q^2\text{—}O\text{—}(A^2\text{—}O)_k\text{—}R^3 \quad (5)$$

wherein R$^f$, Q$^2$ and k are as defined for the formula (4), and R$^3$ is as defined above.

The compound represented by the formula (4) corresponds to a compound of the formula (1) wherein R$^1$ is a hydrogen atom, and Q$^1$ is a C$_{3-5}$ linear or branched alkylene group. The compound represented by the formula (5) corresponds to a compound of the formula (1) wherein R$^1$ is a C$_{1-18}$ hydrocarbon group or a C$_{1-18}$ acyl group, and Q$^1$ is a C$_{3-5}$ linear or branched alkylene group.

The fluorine-containing hydroxyl compound (formula (2)) is a known compound, and can be produced by known methods. It can be synthesized, for example, by adding allylalcohol to a perfluoroalkyl iodide, followed by substitution of the iodide atoms by hydrogen atoms by a reducing agent.

Further, the cyclic ether (formula (3)) which undergoes the ring opening polymerization in the presence of the fluorine-containing hydroxyl compound (formula (2)) has, as the A$^2$ part, a C$_{2-4}$ linear alkylene group or a group having at least one hydrogen atom of said alkylene group substituted by a hydrocarbon group which may contain ethereal oxygen atoms. Preferred modes of A$^2$ are as defined for A$^1$ in the formula (1).

The cyclic ether (formula (3)) may, for example, be ethylene oxide, propylene oxide, 1,2-butylene oxide, 2,3-butylene oxide, isobutylene oxide, oxetane, methyloxetane, phenyl glycidyl ether, tetrahydrofuran, styrene oxide or an alkyl glycidyl ether. The alkyl glycidyl ether may, for example, be methyl glycidyl ether, butyl glycidyl ether or 2-ethylhexyl glycidyl ether.

Among these, as the cyclic ether (formula (3)), ethylene oxide, propylene oxide, 1,2-butylene oxide and tetrahydrofuran are preferred.

At least one kind of the cyclic ether (formula (3)) may be used, and it is preferred to use one or two kinds of them.

In the case where at least two kinds of the cyclic ethers (formula (3)) undergo the ring opening polymerization, they may be mixed to conduct the reaction, or they may be successively reacted. Further, in either case of using one kind of the cyclic ether (formula (3)), or in the case of using at least two kinds of them, they may be charged at a stretch, or may be gradually added to the reaction system.

The amount of the cyclic ether (formula (3)) to the fluorine-containing hydroxyl compound (formula (2)) may be suitably changed depending upon the value of the k of the desired compound (in the case where a mixture is obtained, average k, i.e. k$_{av}$). Usually, it is preferred to use it from 1 to 1.5 molar times the theoretical amount for the reaction.

The ring opening polymerization of the cyclic ether (formula (3)) in the presence of the fluorine-containing hydroxyl compound (formula (2)), is conducted in the presence of an acid catalyst.

As the acid catalyst, boron trifluoride, an ether complex of boron trifluoride, aluminum chloride, antimony pentachloride, ferric chloride or a condensed inorganic acid is preferred, and an ether complex of boron trifluoride is particularly preferred. As the condensed inorganic acid, a heteropoly-acid constituted by at least two metallic elements is preferred, and e.g. phosphomolybdic acid, phosphowolframate, silicomolybdic acid or silicotungstic acid is preferred.

The amount of the acid catalyst is preferably from 0.01 to 5 parts by weight, particularly preferably from 0.1 to 3 parts by weight, based on 100 parts by weight of the theoretical amount of the fluorine-containing oxyalkylene compound (formula (4)) produced.

The method of the present invention has an advantage that the reaction proceeds with a particularly high yield, when producing a compound of the formula (1) wherein Q$^1$ is a C$_{3-5}$ linear or branched alkylene group. Namely, with regard to a compound having a linear or branched alkylene group of a carbon number of at least 3 inserted between the R$^f$ group and the hydroxyl group, such as the compound of the formula (2), since the electric absorptivity derived from the R$^f$ group can be made adequately low, the reactivity of the terminal hydroxyl group will be high under the acid catalyst conditions, whereby side reactions such as production of an olefin due to separation of hydrogen are less likely to take place, such being advantageous.

Further, as the catalyst can be removed only by conducting a usual purification treatment after the reaction, it is not necessary to worry about bad influences derived from the catalyst, such being advantageous. Further, the kind of the alkylene oxide unit can be freely changed, the method of the present invention is thereby an excellent method to be used widely.

Usually, a compound obtainable by a method wherein a cyclic ether undergoes ring opening polymerization, is in many cases a mixture of compounds having different molecular weights. By the above-mentioned method of the present invention, fluorine-containing alkylene compounds represented by the formula (4) can be obtained, as a mixture of compounds having different molecular weights.

Namely, the present invention resides in a method for producing a mixture of the fluorine-containing oxyalkylene compounds represented by the formula (4), which comprises ring opening polymerization of at least one cyclic ether represented by the formula (3) in the presence of an acid catalyst and the fluorine-containing hydroxyl compound represented by the formula (2), said mixture having a ratio of the weight average molecular weight ($M_w$) to the number average molecular weight ($M_n$) (i.e. $M_w/M_n$) of at least 1.1.

By the method of the present invention, particularly a mixture of fluorine-containing alkylene compounds (formula (4)) having $M_w/M_n$ of at least 1.1 can be easily obtained. When a single compound is selected as the fluorine-containing hydroxyl compound (formula (2)), a mixture of the fluorine-containing alkylene compounds (formula (4)) having $M_w/M_n$ of at least 1.1 can be obtained by the method. Accordingly, it is evident that the mixture of the fluorine-containing alkylene compounds (formula (4)) having different values of k, can be produced by the method.

To obtain a mixture of the fluorine-containing alkylene compounds (formula (4)) having $M_w/M_n$ of at least 1.1 by the method, it is preferred to conduct the reaction by using a three-membered cyclic ether (formula (3)) wherein $A^2$ is a $C_2$ linear alkylene group or a group having at least one hydrogen atom of said alkylene group substituted by a hydrocarbon group which may contain ethereal oxygen atoms, as the essential component.

Further, in such a case, the distribution of the values of k of each compound in the mixture is considered to be broad. When the average value of k in the mixture is taken as $k_{av}$, values of k of each compound distribute in a range of from 0 to 3 $k_{av}$.

Further, it is particularly preferred to conduct the above-mentioned ring opening polymerization in the presence of a solvent, as a side reaction of separation of hydrogen atoms in the —$CH_2$— group bonded to the terminal of the $R^f$ group, is prevented.

As the solvent, an ether solvent having no active hydrogen is preferred, and glyme (ethylene glycol dimethyl ether), diglyme (diethylene glycol dimethyl ether), triglyme (triethylene glycol dimethyl ether) or methyl tert-butyl ether is particularly preferred. The solvent may be used alone or as a mixture of at least two of them.

In the reaction wherein the cyclic ether (formula (3)) undergoes the ring opening polymerization in the presence of the fluorine-containing hydroxyl compound (formula (2)), the reaction temperature is preferably from −20° C. to +180° C., particularly preferably from 0° C. to +130° C. However, in the case where a solvent having a low boiling point is present in the reaction system, it is preferred to conduct reaction at a temperature lower than (the boiling point of the solvent +20)° C., considering the increase in the internal pressure.

The amount of the fluorine-containing hydroxyl compound (formula (2)) charged into a reactor may be suitably changed depending upon the amount of the cyclic ether (formula (3)). In the case where effective stirring is attempted, it is preferred to charge it in an amount of at least one-tenth of the capacity of the reactor. Considering the volumetric efficiency, the amount of the product after the ring opening polymerization of the cyclic ether (formula (3)) is preferably from 80 to 95% in volume fraction.

In the reaction wherein the fluorine-containing hydroxyl compound (formula (3)) undergoes the ring opening polymerization in the presence of the cyclic ether (formula (2)), the fluorine-containing oxyalkylene compounds (formula (4)) are produced.

The fluorine-containing oxyalkylene compounds (formula (4)) can be induced to a compounds represented by the formula (5), by converting the terminal hydroxyl group to a $R^3O$— group, wherein $R^3$ is as defined above, as the case requires.

By converting the terminal hydroxyl group of the fluorine-containing oxyalkylene compounds (formula (4)) to an alkoxy group or an acyloxy group, various properties can be controlled.

As a method to convert the terminal hydroxyl group of the fluorine-containing oxyalkylene compound (formula (4)) to the —$OR^3$ group, wherein $R^3$ is a $C_{1-18}$ hydrocarbon group, a known method for alkoxylation can be employed. It may, for example, be a method to react the fluorine-containing oxyalkylene compounds (formula(4)) with a $C_{1-18}$ hydrocarbon monohalide under strong alkali condition, a method to react the fluorine-containing hydroxyalkylene compounds (formula(4)) with a $C_{1-18}$ alkyl sulfuric acid, or a method to convert the hydroxyl group of the fluorine-containing hydroxyalkylene compounds (formula(4)) to a tosyloxy group, which then undergoes $C_{1-18}$ alkoxylation.

Among these, the method to react the fluorine-containing hydroxyalkylene compounds (formula(4)) with an alkyl sulfuric acid, or the method to conduct alkoxylation of the tosyloxy group, is preferred, to suppress the reaction of fluorine-separation from the fluorine-containing oxyalkylene compound (formula (4)).

The method for converting the terminal hydroxyl group of the fluorine-containing oxyalkylene compounds (formula (4)) to $C_{1-18}$ acyloxy group (hereinafter referred to as esterification), may be a method to react the fluorine-containing oxyalkylene compounds (formula(4)) with a monocarboxylic acid, or with an ester of monocarboxylic acid and an alcohol having a low boiling point (hereinafter such compounds are referred to as esterification agents).

The monocarboxylic acid may, for example, be acetic acid, propionic acid, butanoic acid, 2-ethyl hexanoic acid, n-octanoic acid, 3,5,5-trimethyl hexanoic acid (isononanoic acid), oleic acid or stearic acid.

As the ester of the above-mentioned monocarboxylic acid and an alcohol having a low boiling point, e.g. methyl acetate, ethyl acetate, butyl acetate, isopropyl acetate and methyl propionate are preferred.

The esterification can be conducted in such a manner that an esterification agent is added to the fluorine-containing hydroxyalkylene compounds (formula(4)), the mixture is heated and stirred for the reaction, and dehydration or dealcohol is conducted, or unreacted acids are distilled off.

The esterification can be conducted with or without a catalyst. In the case where a catalyst is present, preferred is a method wherein a trace amount of an acid catalyst such as p-toluene sulfonic acid or sulfuric acid is present, or a method wherein an alkali catalyst such as potassium hydroxide or sodium hydroxide is present.

A crude product obtained by the reaction to convert the terminal hydroxyl group of the fluorine-containing oxyalkylene compounds (formula (4)), is preferably purified by e.g. an acid treatment using sulfuric acid, phosphoric acid or the like, or an adsorption treatment using a synthetic magnesium, activated clay, activated carbon or the like, as the case requires.

In the present invention, the above-mentioned fluorine-containing compounds (mixture) are also used as a cement admixture. By incorporating said cement admixture in concrete, excellent fluidity can be imparted to concrete. This is considered to be attributable to the fact that the fluorine-containing compounds (mixture) have a chemical or physical action on cement particles in concrete, whereby secondary agglomeration of cement particles is prevented.

On the other hand, the fluorine-containing compounds (mixture) have a low foamability, and have an effect to easily eliminate foams once formed. Accordingly, concrete is less likely to involve air during mixing, whereby the strength of the hardened product of concrete will not be lowered, such being advantageous.

As the concrete, cement mortar obtained by blending sand into various cements, followed by kneading with water, or fresh concrete obtained by blending e.g. sand, shingle or water in a suitable ratio in said various cements, may be mentioned. As said cement, plain Portland cement, high-early-strength Portland cement, low heat Portland cement or Portland blast furnace cement may, for example, be mentioned.

As the time to incorporate the fluorine-containing compounds (mixture) in concrete, just like a conventional cement admixture, it may be added to cement when water, or various aggregates such as sand or shingle, as the case requires, are added to cement followed by mixing; the fluorine-containing compounds may be preliminarily dispersed or dissolved in water; or it may be added together with a surface active agent such as an air-entraining agent or a water reducing agent, or a dispersing agent.

The amount of the fluorine-containing compounds (mixture) may be less than 10 parts by weight based on 100 parts by weight of total concrete, and it may be from 300 to 1000 ppm.

The fluorine-containing compounds of the present invention have an advantage that excellent effects can be obtained with a significantly small amount of them, as compared with the amount of conventional cement admixture added (from 1 to 3 wt %).

The fluorine-containing compounds (mixture) of the present invention have effects that when they are dispersed in water, even when the dispersant is shook strongly, the foamability is low, and the foams once formed disappear quickly. Accordingly, they may be used for a use of e.g. an aqueous cleaner for which chlorinated fluorinated hydrocarbons are conventionally used, which requires a low foamability, or for a resin additive for the purpose of improving the resin, in addition for a use as a cement admixture.

The present invention further provides a novel surface active agent, i.e. a surface active agent which comprises fluorine-containing compounds represented by the formula (6):

$$R^f\text{—}CH_2CH_2CH(CH_3)\text{—}O\text{—}(A^1\text{—}O)_k\text{—}R^1 \qquad (6)$$

wherein $R^f$ is a $C_{1-22}$ polyfluoroaliphatic hydrocarbon group which may contain ethereal oxygen atoms or thioethereal sulfur atoms, k is an integer of from 1 to 100, $A^1$ is a $C_{2-4}$ linear alkylene group or a group having at least one hydrogen atom of said alkylene group substituted by a hydrocarbon group which may contain ethereal oxygen atoms, provided that when k is from 2 to 100, plurality of $A^1$ may be the same or different, and $R^1$ is a hydrogen atom, a $C_{1-18}$ hydrocarbon group or a $C_{1-18}$ acyl group.

The fluorine-containing compound represented by the formula (6) is a compound having a low surface tension. Said surface active agent may be used alone, or in combination as a mixture with other surface active agent.

The mixture of the fluorine-containing compounds represented by the formula (6), having a ratio of the weight average molecular weight ($M_w$) to the number average molecular weight ($M_n$) (i.e. $M_w/M_n$) of at least 1.1, has effects that the foamability is low, and the foams once formed are easily eliminated, whereby it is more excellent as a surface active agent.

The cement admixture of the present invention comprises excellent compounds which impart excellent fluidity to fresh concrete. With regard to concrete in which said cement admixture is incorporated, workability is excellent, and the content of air can be suppressed, whereby a hardened product of concrete having suppressed foamability and high strength, can be obtained.

Further, by the method of the present invention, fluorine-containing compounds useful as a cement admixture can be effectively produced with a high yield.

The fluorine-containing compounds of the present invention have a low surface tension and a low foamability, whereby it may be used for an aqueous cleaner or for a resin additive for the purpose of improving the resin.

The present invention further provides a novel surface active agent.

EXAMPLES

Examples 1 to 12 are Examples for syntheses of fluorine-containing compounds, Examples 13 to 21 are Comparative Synthesis Examples, Examples 22 to 28 are Examples for evaluation of fluorine-containing compounds, Examples 29 to 40 are Comparative Evaluation Examples, and Examples 41 and 42 are Reference Examples. The ($C_3H_6O$) moiety in compounds in Examples means an oxypropylene group.

$M_w/M_n$ was obtained by gel permeation chromatography (GPC) using dichloropentafluoropropane as a solvent, and gas chromatography-mass spectrometry analysis (GC-MAS).

Example 1

Example for Synthesis of Fluorine-Containing Compounds 500 g of $CF_3(CF_2)_7(CH_2)_3OH$ as a powder was added to a stainless pressure-resistant autoclave, and 5 g of $BF_3$ etherate and 500 g of glyme were added thereto, followed by stirring to dissolve them. The temperature was raised to 60° C., and while the temperature was kept at 60° C., 546 g of propylene oxide was continuously introduced thereto over a period of 3 hours.

The aging reaction was conducted further for 5 hours, and unreacted propylene oxide was distilled off under reduced pressure to obtain a crude product. Then, KW-1000 and KW-600 (tradenames, each manufactured by Kyowa Chemical Industry Co., Ltd.) as adsorbents, were successively added thereto, each in an amount of 1 part by weight based on 100 parts by weight of the crude product, followed by dehydration and filtration, to obtain fluorine-containing compounds (1a). The hydroxyl number of the fluorine-containing compounds (1a) was 57.4 mgKOH/g. By NMR spectrum ($^1$H-NMR, $^{19}$F-NMR and $^{13}$C-NMR) of the product, the production of $CF_3(CF_2)_7(CH_2)_3O(C_3H_6O)_nH$, wherein the average of n obtained from the hydroxyl number was 8.6, was confirmed. $M_w/M_n$ was 1.16.

Example 2

Example for Synthesis of Fluorine-Containing Compounds

The reaction was conducted in the same manner as in Example 1, except that 546 g of a mixture comprising propylene oxide and ethylene oxide with a weight ratio of 4 to 6, was used instead of propylene oxide, to obtain fluorine-containing compounds (1b). The hydroxyl number of the fluorine-containing compounds (1b) was 56.8 mgKOH/g. By NMR spectrum of the product, the production of $CF_3(CF_2)_7(CH_2)_3O(C_3H_6O)_m(CH_2CH_2O)_nH$, wherein the linkage of oxyethylene and oxypropylene was random, the average of m+n obtained from the hydroxyl number was 10, and the average of m:n was 4:6, was confirmed. $M_w/M_n$ was 1.14.

Example 3

Example for Synthesis of Fluorine-Containing Compounds

The reaction was conducted in the same manner as in Example 1, except that 546 g of a mixture comprising tetrahydrofuran and propylene oxide with a weight ratio of 6 to 4, was used instead of propylene oxide, to obtain fluorine-containing compounds (1c). The hydroxyl number of the fluorine-containing compounds (1c) was 59.2 mgKOH/g. By NMR spectrum of the product, the production of $CF_3(CF_2)_7(CH_2)_3O(C_3H_6O)_m[(CH_2)_4O]_nH$, wherein the linkage of oxytetramethylene and oxypropylene was random, the average of m+n obtained from the hydroxyl number was 7, and the average of m:n was 6:4, was confirmed. $M_w/M_n$ was 1.11.

Example 4

Example for Synthesis of Fluorine-Containing Compounds 500 g of $CF_3(CF_2)_7(CH_2)_3OH$ as a powder was added to a stainless pressure-resistant autoclave, and 0.5 g of $BF_3$ etherate and 250 g of glyme were added thereto, followed by stirring to dissolve them. Then, the temperature was raised to 40° C., and while the temperature was kept at 40° C., 622 g of ethylene oxide was continuously introduced thereto over a period of 3 hours.

The aging reaction was conducted further for 8 hours, and unreacted ethylene oxide was distilled off under reduced pressure to obtain a crude product. A 10% sodium hydroxide aqueous solution was added thereto to neutralize acid contents, and KW-1000 and KW-600 (tradenames, each manufactured by Kyowa Chemical Industry Co., Ltd.) as adsorbents, were successively added thereto, each in an amount of 1 part by weight based on 100 parts by weight of the crude product, followed by dehydration and filtration, to obtain fluorine-containing compounds (1d). The hydroxyl number of the fluorine-containing compounds (1d) was 56.3 mgKOH/g. By NMR spectrum of the product, the production of $CF_3(CF_2)_7(CH_2)_3O(CH_2CH_2O)_nH$, wherein the average of n obtained from the hydroxyl number was 11.8, was confirmed. $M_w/M_n$ was 1.12.

The surface tension of 0.01 wt % aqueous solution of the fluorine-containing compounds (1d) was 17.6 dyn/cm.

Example 5

Example for Synthesis of Fluorine-Containing Compounds

The reaction was conducted in the same manner as in Example 4, except that 1456 g of ethylene oxide was used, to obtain fluorine-containing compounds (1e). The hydroxyl number of the fluorine-containing compounds (1e) was 36.8 mgKOH/g. By NMR spectrum, the production of $CF_3(CF_2)_7(CH_2)_3O(CH_2CH_2O)_nH$, wherein the average of n obtained from the hydroxyl number was 23.8, was confirmed. $M_w/M_n$ was 1.18.

Example 6

Example for Synthesis of Fluorine-Containing Compounds 200 g of the fluorine-containing compounds (1d) obtained in Example 4 was charged into a reactor, 80 g of water and 15 g of KOH were added thereto, and while the mixture was being stirred at a temperature of 60° C., 25 g of dimethylsulfuric acid was dropwise added thereto over a period of 3 hours. Stirring was kept further for 5 hours, to obtain a crude product. The stirring was terminated, the mixture was left so that it was separated into two layers, and the organic layer was recovered. Then, KW-1000 and KW-600 as adsorbents, were successively added thereto, each in an amount of 1 part by weight based on 100 parts by weight of the crude product, followed by dehydration and filtration, to obtain fluorine-containing compounds (1f). The terminal methylation ratio obtained from the hydroxyl number was 95 mol %. By NMR spectrum, the structure of the main product was confirmed to be $CF_3(CF_2)_7(CH_2)_3O(CH_2CH_2O)_nCH_3$, wherein the average of n obtained from the hydroxyl number was 11.8.

Example 7

Example for Synthesis of Fluorine-Containing Compounds

Instead of ethylene oxide in Example 4, 300 g of tetrahydrofuran, 243 g of propylene oxide and 92 g of ethylene oxide were successively added to the mixture, to obtain fluorine-containing compounds (1h). The hydroxyl number of the fluorine-containing compounds (1h) was 52.6 mgKOH/g. By NMR spectrum of the product, the production of $CF_3(CF_2)_7(CH_2)_3O[(CH_2)_4O]_m(C_3H_6O)_n(CH_2CH_2O)_pH$, wherein the linkage of the oxyalkylene groups was the block chain in order as shown in the formula, the average of m:n:p was 2:2:1, and the average of (m+n+p) obtained from the hydroxyl number was 10.0, was confirmed. $M_w/M_n$ was 1.11.

The surface tension of 0.01 wt % aqueous solution of the fluorine-containing compounds (1h) was 18.4 dyn/cm.

Example 8

Example for Synthesis of Fluorine-Containing Compounds 500 g of $CF_3(CF_2)_7CH_2CH_2CH(CH_3)OH$ as a powder was added to a stainless pressure-resistant autoclave, and 0.5 g of $BF_3$ etherate and 250 g of glyme were added thereto, followed by stirring to dissolve them. Then, the temperature was raised to 30° C., and while the temperature was kept at 30° C., 546 g of a mixture comprising tetrahydrofuran and ethylene oxide with a weight ratio of 6 to 4, was continuously introduced thereto over a period of 3 hours.

The aging reaction was conducted further for 5 hours, and unreacted tetrahydrofuran and ethylene oxide were distilled off under reduced pressure to obtain a crude product. A 10% sodium hydroxide aqueous solution was added thereto to neutralize acid contents, and KW-1000 and KW-600 were successively added thereto, each in an amount of 1 part by weight based on 100 parts by weight of the crude product, followed by dehydration and filtration, to obtain fluorine-containing compounds (1i). The hydroxyl number of the fluorine-containing compounds (1i) was 59.2 mgKOH/g. By NMR spectrum of the product, the production of $CF_3(CF_2)_7CH_2CH_2CH(CH_3)O[(CH_2)_4O]_m(CH_2CH_2O)_nH$, wherein the linkage of tetrahydrofuran and ethylene oxide was random, the average of m+n obtained from the hydroxyl number was 7, and the average of the m:n was 5:5, was confirmed. $M_w/M_n$ was 1.11.

Example 9

Synthesis of Fluorine-Containing Compounds

The reaction was conducted in the same manner as in Example 8, except that 546 g of a mixture comprising propylene oxide and ethylene oxide in the weight ratio of 4 to 6 was used instead of the mixture comprising tetrahydrofuran and ethylene oxide, to obtain fluorine-containing compounds (1j). The hydroxyl number of the fluorine-containing compounds (1j) was 56.5 mgKOH/g. By NMR spectrum of the product, the production of $CF_3(CF_2)_7CH_2CH_2CH(CH_3)O(C_3H_6O)_n(CH_2CH_2O)_mH$, wherein the linkage of propylene oxide and ethylene oxide was random, the average of m+n obtained from the hydroxyl number was 10, and the average of m:n was 4:6, was confirmed. $M_w/M_n$ was 1.12.

Example 10

Synthesis of Fluorine-Containing Compounds

The reaction was conducted in the same manner as in Example 8, except that 546 g of ethylene oxide was used instead of the mixture comprising tetrahydrofuran and ethylene oxide, to obtain fluorine-containing compounds. (1k). The hydroxyl number of the fluorine-containing compounds (1k) was 56.3 mgKOH/g. By NMR spectrum of the product, the production of $CF_3(CF_2)_7CH_2CH_2CH(CH_3)O(CH_2CH_2O)_nH$, wherein the average of n obtained from the hydroxyl number was 11, was confirmed. $M_w/M_n$ was 1.12.

Example 11

Synthesis of Fluorine-Containing Compounds

The reaction was conducted in the same manner as in Example 10, except that $CF_3(CF_2)_7(CH_2)_5OH$ was used as an initiator, instead of $CF_3(CF_2)_7CH_2CH_2CH(CH_3)OH$, to obtain fluorine-containing compounds (1m). The hydroxyl number of the fluorine-containing compounds (1m) was 56.3 mgKOH/g. By NMR spectrum of the product, the production of $CF_3(CF_2)_7(CH_2)_5O(CH_2CH_2O)_nH$, wherein the average of n obtained from the hydroxyl number was 11, was confirmed. $M_w/M_n$ was 1.12.

Example 12

Synthesis of Fluorine-Containing Compounds 500 g of a mixture of 3-perfluoroalkyl propanol comprising $CF_3(CF_2)_5(CH_2)_3OH$, $CF_3(CF_2)_7(CH_2)_3OH$, $CF_3(CF_2)_9(CH_2)_3OH$ and $CF_3(CF_2)_{11}(CH_2)_3OH$ with a molar ratio of 9:47:37:7 and the number average molecular weight of 520 as a powder was added to a stainless pressure-resistant autoclave, and 0.5 g of $BF_3$ etherate and 250 g of glyme were added thereto, followed by stirring to dissolve them. Then, the temperature was raised to 40° C., and while the temperature was kept at 40° C., 573 g of ethylene oxide was continuously introduced thereto over a period of 3 hours.

The aging reaction was conducted further for 5 hours, and unreacted ethylene oxide was distilled off under reduced pressure to obtain a crude product. Then, KW-1000 and KW-600 were successively added thereto, each in an amount of 0.5 part by weight based on 100 parts by weight of the crude product, followed by dehydration at a temperature of 120° C. and filtration, to obtain fluorine-containing compounds (1n) as liquid at normal temperature. The hydroxyl number of the fluorine-containing compounds (1f) was 56.2 mgKOH/g.

By NMR spectrum of the product, the production of $CF_3(CF_2)_q(CH_2)_3O(CH_2CH_2O)_nH$ was confirmed. $M_w/M_n$ was 1.12.

Example 13

Comparative Synthesis Example 500 g of $CF_3(CF_2)_7CH_2CH_2OH$ as a powder was added to a stainless pressure-resistant autoclave, 5.2 g of a methanol solution having 28 wt % of sodium methoxide and 94.8 g of methanol were added thereto, and the temperature was raised to 50° C. The mixture was stirred to dissolve them, and methanol was distilled off under reduced pressure. Then, the temperature was raised to 70° C., and while the temperature was kept at 70° C., 578 g of propylene oxide was continuously introduced thereto over a period of 3 hours.

After the completion of the reaction, unreacted propylene oxide was distilled off under reduced pressure to obtain a crude product. An aqueous phosphoric acid solution was added thereto for neutralization, and KW-1000 and KW-600 were successively added thereto, each in an amount of 1 part by weight based on 100 parts by weight of the crude product, followed by dehydration and filtration, to obtain a liquid material. As a result of analysis of the liquid material by gas chromatography (GC), gel permeation chromatography (GPC) and NMR spectrum, the main components were $C_8F_{17}CH=CH_2$ (boiling point: 149° C.) and $C_8F_{17}CH_2CH_2OH$, and the ratio of the desired product $C_8F_{17}CH_2CH_2O(C_3H_6O)_nH$ wherein the average of n obtained from the hydroxyl number was 1.3 (hereinafter referred to as compounds (1p)) was 4.2% (area % in GC). The hydroxyl number of the compounds (1p) was 103.6 mgKOH/g.

Example 14

Comparative Synthesis Example 500 g of $CF_3(CF_2)_7CH_2CH_2OH$ as a powder was added to a stainless pressure-resistant autoclave, and 0.5 g of $BF_3$ etherate and 250 g of glyme were added thereto, followed by stirring to dissolve them. The temperature was raised to 40° C., and while the temperature was kept at 40° C., 578 g of propylene oxide was continuously introduced thereto over a period of 3 hours.

After the completion of the reaction, unreacted propylene oxide was distilled off under reduced pressure to obtain a crude product. A 10% sodium hydroxide aqueous solution was added thereto for neutralization, and KW-2000 and KW-500 were successively added thereto, each in an amount of 1 part by weight based on 100 parts by weight of the crude product, followed by dehydration and filtration, to obtain a liquid material. As a result of analysis of the liquid material by GC, GPC and NMR spectrum, the main component was $C_8F_{17}CH_2CH_2OH$, and 17.5% (area % in GC) of $C_8F_{17}CH=CH_2$ (boiling point: 149° C.) was contained in the product.

Further, $CF_3(CF_2)_7CH_2CH_2O(C_3H_6O)_nH$, wherein the average of n obtained from the hydroxyl number was 2.2 (hereinafter referred to as compounds (1q)), was contained in an amount of 18% (area % in GC) in the product. The hydroxyl number of the compounds (1q) was 94.8 mgKOH/g.

Example 15

Comparative Synthesis Example 500 g of $CF_3(CF_2)_7CH_2CH_2OH$ as a powder was added to a stainless pressure-resistant autoclave, and 0.25 g of copper hexacyanocobaltate complex was added thereto. The temperature was raised to 65° C., and the mixture was stirred for dissolution. Then, the temperature was raised to 80° C., and while the temperature was kept at 80° C., 548 g of propylene oxide was continuously introduced thereto over a period of 3 hours.

After the completion of the reaction, unreacted propylene oxide was distilled off under reduced pressure, and a brown high-viscous liquid was obtained. For the purpose of removing copper hexacyanocobaltate complex, a chelating agent was added thereto. However, copper hexacyanocobaltate complex was not coordinated, whereby copper hexacyanocobaltate complex could not be removed. KW-2000 and KW-500 were added thereto, each in an amount of 1 part by weight based on 100 parts by weight of the brown high-viscous liquid, followed by dehydration and filtration. However, copper hexacyanocobaltate complex could not be recovered, and the brown high-viscous liquid was obtained. Hereinafter the brown high-viscous liquid will be referred to as compound (X1).

Example 16

Comparative Synthesis Example 50 g of a hydroxyl compound $CH_3(CH_2)_3CH(CH_2CH_3)CH_2OH$ and 2.6 g of a methanol solution having 28% sodium methoxide were added to a stainless pressure-resistant autoclave, followed by mixing by stirring, and then methanol was distilled off under reduced pressure. The temperature was raised to 70° C., and while the temperature was kept, propylene oxide was continuously introduced thereto, and 1673 g of propylene oxide was introduced thereto over a period of 3 hours.

After the completion of the reaction, unreacted propylene oxide was distilled off under reduced pressure to obtain a crude product. A phosphoric acid aqueous solution was added thereto to neutralize alkali contents, KW-1000 and KW-600 were added thereto, each in an amount of 1 part by weight based on 100 parts by weight of the crude product to adsorb excessive inorganic compounds such as phosphoric acid, potassium hydroxide and neutralized salt, followed by dehydration, filtration and drying, to obtain compounds (X2). The hydroxyl number was 58.3 mgKOH/g, and the production of $CH_3(CH_2)_3CH(CH_2CH_3)CH_2O(C_3H_6O)_nH$ wherein the average of n obtained from the hydroxyl number was 14.3 (hereinafter referred to as compounds (X2)), was confirmed.

Example 17

Comparative Synthesis Example 300 g of decanol and 1.0 g of 95% potassium hydroxide were added to a stainless pressure-resistant autoclave, followed by mixing by stirring at a temperature of 65° C. The temperature was raised to 130° C., and water was removed under reduced pressure. The temperature was lowered to 70° C., and while the temperature was kept at 70° C., 1599 g of ethylene oxide was continuously introduced thereto over a period of 3 hours.

After the completion of the reaction, unreacted ethylene oxide was distilled off under reduced pressure, to obtain a crude product. A phosphoric acid aqueous solution was added thereto for neutralization, and KW-1000 and KW-600 were successively added thereto, each in an amount of 1 part by weight based on 100 parts by weight of the crude product, followed by dehydration and filtration, to obtain compounds (X3). The hydroxyl number of the compounds (X3) was 57.9 mgKOH/g, and by NMR spectrum, the production of $CH_3(CH_2)_9O(CH_2CH_2O)_nH$, wherein the average of n obtained from the hydroxyl number was 18, was confirmed.

The surface tension of 0.01 wt % aqueous solution of the compounds was 34.2 dyn/cm.

Example 18

Comparative Synthesis Example 500 g of $CF_3(CF_2)_7(CH_2)_3OH$ as a powder was added to a stainless pressure-resistant autoclave, and 0.25 g of zinc hexacyanocobaltate complex was added thereto. The temperature was raised to 65° C., followed by stirring to dissolve them. Then, the temperature was raised to 80° C., and while keeping the temperature at 80° C., 546 g of a mixture comprising propylene oxide and ethylene oxide with a weight ratio of 4 to 6 was continuously introduced thereto over a period of 3 hours.

The aging reaction was conducted further for 5 hours, and unreacted propylene oxide and ethylene oxide were distilled off under reduced pressure to obtain a crude product. A chelating agent was added thereto to remove heavy metal of the catalyst, and KW-1000 and KW-600 were successively added thereto, each in an amount of 1 part by weight based on 100 parts by weight of the crude compound, followed by dehydration and filtration to obtain fluorine-containing compounds (1r). The hydroxyl number of the fluorine-containing compounds (1r) was 56.5 mgKOH/g. By NMR spectrum of the product, the production of $CF_3(CF_2)_7(CH_2)_3O(C_3H_6O)_m(CH_2CH_2O)_nH$, wherein the linkage of propylene oxide and ethylene oxide was random, the average of m+n obtained from the hydroxyl number was 10, and the average of m:n was 4:6, was confirmed. $M_w/M_n$ was 1.04.

Example 19

Comparative Synthesis Example 500 g of a mixture of 3-perfluoroalkyl-propanol comprising $(CF_3(CF_2)_5(CH_2)_3OH, CF_3(CF_2)_7(CH_2)_3OH, CF_3(CF_2)_9(CH_2)_3OH$ and $CF_3(CF_2)_{11}(CH_2)_3OH$ with a molar ratio of 9:47:37:7 and having a number average molecular weight of 520, as a powder, was added to a stainless pressure-resistant autoclave, and 0.5 g of zinc hexacyanocobaltate complex was added thereto, and the temperature was raised to 65° C. to dissolve them. Then, the temperature was raised to 80° C., and while the temperature was kept at 80° C., 500 g of a mixture comprising ethylene oxide and propylene oxide with a weight ratio of 7 to 3 was continuously introduced thereto over a period of 4 hours.

The aging reaction was conducted further for 5 hours, and unreacted alkylene oxide was removed by deaeration under reduced pressure. A chelating agent was added thereto to remove heavy metal of the catalyst, KW-1000 and KW-600 were successively added thereto, each in an amount of 0.5 part by weight based on 100 parts by weight of the crude product, followed by dehydration and filtration at a temperature of 120° C., to obtain fluorine-containing compounds (1s) as a liquid at normal temperature. The hydroxyl number of the fluorine-containing compounds (1s) was 56.2 mgKOH/g.

By NMR spectrum of the product, the production of $CF_3(CF_2)_q(CH_2)_3O(CH_2CH_2O)_nH$ was confirmed. $M_w/M_n$ was 1.04.

Example 20

Comparative Synthesis Example 500 g of $CF_3(CF_2)_7(CH_2)_2OH$ as a powder was added to a stainless pressure-resistant autoclave, and 1.4 g of $I_2$, 2.0 g of NaI and 1.7 g of $NaBH_4$ were added thereto, followed by stirring to dissolve them. The substitution by nitrogen was conducted three times, the temperature was raised to 120° C., and 560 g of ethylene oxide was continuously introduced thereto over a period of 3 hours.

The aging reaction was conducted further for 5 hours, unreacted ethylene oxide was removed by deaeration under reduced pressure, and nitrogen bubbling was conducted for 30 minutes to remove $I_2$ from the system. KW-1000 and KW-600 were successively added thereto, each in an amount of 0.5 part by weight based on 100 parts by weight of the crude product, followed by dehydration and filtration at a temperature of 120° C., to obtain fluorine-containing compounds (1t) as a solid at normal temperature. The hydroxyl number of the fluorine-containing compounds (1t) was 56.4 mgKOH/g.

By NMR spectrum of the product, the production of $CF_3(CF_2)_7(CH_2)_2O(CH_2CH_2O)_nH$, wherein the average of n obtained from the hydroxyl number was 12, was confirmed.

$M_w/M_n$ was 1.03.

Example 21

Comparative Synthesis Example 500 g of a mixture of 2-perfluoroalkyl-ethanol comprising $CF_3(CF_2)_5(CH_2)_2OH$, $CF_3(CF_2)_7(CH_2)_2OH$, $CF_3(CF_2)_9(CH_2)_2OH$ and $CF_3(CF_2)_{11}(CH_2)_2OH$ with a molar ratio of 9:47:37:7 and having a number average molecular weight of 506, as a powder, was added to a stainless pressure-resistant autoclave, and 1.3 g of $I_2$, 1.9 g of NaI and 1.5 g of $NaBH_4$ were added thereto, followed by stirring to dissolve them. The substitution by nitrogen was conducted 3 times, the temperature was raised to 120° C., and 498 g of ethylene oxide was continuously introduced thereto over a period of 3 hours.

The aging reaction was conducted further for 5 hours, and unreacted ethylene oxide was removed by deaeration under reduced pressure, and nitrogen bubbling was conducted for 30 minutes to remove I2 from the system. KW-1000 and KW-600 were successively added thereto, each in an amount of 0.5 part by weight based on 100 parts by weight of the crude product, followed by dehydration and filtration at a temperature of 120° C., to obtain fluorine-containing compounds (1u) as a solid at normal temperature. The hydroxyl number of the fluorine-containing compounds (1u) was 56.4 mgKOH/g.

By NMR spectrum of the product, the production of $CF_3(CF_2)_q(CH_2)_2O(CH_2CH_2O)_nH$ was confirmed. $M_w/M_n$ was 1.03.

Examples 22 to 28

Examples in Evaluation of Fluorine-Containing Compounds

Using the fluorine-containing compounds (1b), (1e), (1i), (1j), (1k), (1m) and (1n) synthesized in the above-mentioned Synthesis Examples, evaluations of foamability, fluidity and air content were conducted. The results of evaluation of foamability are shown in Table 1, and the results of evaluations of fluidity and air content are shown in Table 2.

The results of measurement in the surface tension of 0.01 wt % aqueous solution of fluorine compounds are shown together in Table 1. The unit is dyn/cm.

Evaluation in Foamability

With regard to a 1% aqueous dispersion of fluorine-containing compounds as a test solution, loss miles value and ampule value were measured. On the test solution, the same test solution was dropped from a height of 120 cm, and the height of foams formed was measured, which was taken as the loss miles value. The unit is mm.

Further, 10 ml of the test solution was put in an ampule of 20 ml followed by shaking, and the height of the foams formed was measured, which was taken as the ampule value. The unit is mm.

Method of Evaluation of Fluidity

Fluidity was evaluated by the following method, in accordance with the method of JIS-R5201.

Water was put in a mixer, fluorine-containing compounds were added thereto, and cement and sand were successively added thereto, whereby flow value (mm) was evaluated. Commercially available Portland cement manufactured by Mitsubishi Materials Corporation and quartz sand No. 6 manufactured by Tokai Chemical Industry Co., Ltd. were used, as cement and sand, respectively.

Here, the water content was adjusted to be 55 wt % based on the total amount of concrete having water added, whereas it is 60 wt % in the method described in JIS.

Method of Evaluation of Air Content

It was measured in accordance with a method of JIS-A1118. The unit is vol %.

Examples 29 to 41

Examples in Evaluation of Comparative Compounds

Using, instead of the fluorine-containing compounds of Example 22, the fluorine-containing compounds (1r), (1s), (1t) or (1u) synthesized in the above-mentioned Comparative Synthesis Examples, fluorine-containing compounds having a $M_w/M_n$ value of 1.04 manufactured by Du Pont Kabushiki Kaisha, tradename: ZONYL FSN (hereinafter referred to as ZONYL), a fluorine type surface active agent comprising compounds which contain amide bonds manufactured by Asahi Glass Company Ltd., tradename: Surfluone S-141 (hereinafter referred to as S141) or Surfluone S-145 (hereinafter referred to as S145), the compounds (X2) obtained in Example 16, the compounds (X3) obtained in Example 17 or a water reducing agent comprising compounds which do not contain fluorine, manufactured by Kao Corporation, tradename: Mighty 150 (hereinafter referred to as M150), foamability, fluidity and air content were evaluated in the same manner as in Example 22

Fluidity and air content were evaluated by adding respective compounds in an amount as shown in Table 2 to concrete.

The results are shown in Tables 1 and 2.

Examples 41 and 42

Reference Evaluation Examples

Fluidity and air content were evaluated without adding the fluorine-containing compounds of Example 22 to concrete. The amount of water was as shown in Table 2. The results are show in Table 2.

TABLE 1

| Example | Compounds | Surface tension | Loss miles value | Ampule value |
|---|---|---|---|---|
| 22 | 1b | 21.2 | 12 | 1 |
| 23 | 1e | 17.8 | 8 | 1 |
| 24 | 1i | 22.4 | 12 | 1 |
| 25 | 1j | 19.8 | 12 | 1 |
| 26 | 1k | 17.6 | 10 | 1 |
| 27 | 1m | 18.3 | 11 | 1 |
| 28 | 1n | 18.0 | 8 | 1 |
| 29 | 1r | 36.2 | 28 | 10 |
| 30 | 1s | 35.9 | 27 | 9 |
| 31 | 1t | 17.2 | 25 | 8 |
| 32 | 1u | 17.0 | 24 | 8 |
| 33 | ZONYL | 16.8 | 25 | 8 |
| 34 | S141 | 18.2 | 28 | 10 |
| 35 | S145 | 17.6 | 187 | 20 |
| 36 | X2 | 32.4 | 32 | 10 |
| 37 | X3 | 34.2 | 36 | 13 |
| 38 | M150 | — | — | — |
| 39 | M150 | — | — | — |
| 40 | M150 | — | — | — |

TABLE 2

| Example | Compounds | Amount added | Amount of water | Flow value | Air content |
|---|---|---|---|---|---|
| 22 | 1b | 300 | 55 | 234 | 3% |
| 23 | 1e | 300 | 55 | 232 | 4% |
| 24 | 1i | 300 | 55 | 234 | 3% |
| 25 | 1j | 300 | 55 | 231 | 3% |
| 26 | 1k | 300 | 55 | 232 | 3% |
| 27 | 1m | 300 | 55 | 230 | 4% |
| 28 | 1n | 300 | 55 | 232 | 4% |
| 29 | 1r | 300 | 55 | 226 | 8% |
| 30 | 1s | 300 | 55 | 225 | 8% |
| 31 | 1t | 300 | 55 | 219 | 10% |
| 32 | 1u | 300 | 55 | 220 | 10% |
| 33 | ZONYL | 300 | 55 | 220 | 10% |
| 34 | S141 | 300 | 55 | 249 | 21% |
| 35 | S145 | 300 | 55 | 224 | 17% |
| 36 | X2 | 300 | 55 | 192 | 3% |
| 37 | X3 | 300 | 55 | 188 | 7% |
| 38 | M150 | 300 | 55 | 192 | 2% |
| 39 | M150 | 3000 | 55 | 193 | 1% |
| 40 | M150 | 30000 | 55 | 230 | 3% |
| 41 | — | — | 55 | 192 | 3% |
| 42 | — | — | 65 | 242 | 2% |

What is claimed is:

1. A cement admixture, comprising:
   a cement; and
   at least one fluorine-containing compound represented by formula (1):

$$R^f\text{—}Q^1\text{—}O\text{—}(A^1\text{—}O)_k\text{—}R^1 \qquad (1),$$

wherein
   $R^f$ is a $C_{1-22}$ polyfluoroaliphatic hydrocarbon group which may contain ethereal oxygen atoms or thioethereal sulfur atoms.
   $Q^1$ is a $C_{1-5}$ linear or branched alkylene group,
   k is an integer of from 1 to 100,
   $A^1$ is a $C_{2-4}$ linear alkylene group or a group having at least one hydrogen atom of said alkylene group substituted by a hydrocarbon group which may contain ethereal oxygen atoms, provided that when k is from 2 to 100, the plurality of $A^1$ may be the same or different, and
   $R^1$ is a hydrogen atom, a $C_{1-18}$ hydrocarbon group or a $C_{1-18}$ acyl group;
   wherein said mixture has a ratio of the weight average molecular weight, $M_w$, to the number average molecular weight, $M_n$, of at least 1.1.

2. The cement admixture according to claim 1, wherein $R^1$ is a hydrogen atom.

3. The cement admixture according to claim 1, wherein $A^1$ is an ethylene group and/or a propylene group.

4. The cement admixture according to claim 1, wherein $R^f$ is a $C_{4-22}$ perfluoroalkyl group.

5. The cement admixture according to claim 2, wherein $A^1$ is an ethylene group and/or a propylene group.

6. The cement admixture according to claim 2, wherein $R^f$ is a $C_{4-22}$ perfluoroalkyl group.

7. The cement admixture according to claim 3, wherein $R^f$ is a $C_{4-22}$ perfluoroalkyl group.

8. A concrete which contains the cement admixture as defined in claim 1.

9. A surface active agent, comprising:
   a fluorine-containing compound represented by formula (6):

$$R^f\text{—}CH_2CH_2CH(CH_3)\text{—}O\text{—}(A^1\text{—}O)_k\text{—}R^1 \qquad (6)$$

wherein
   $R^f$ is a $C_{1-22}$ polyfluoroaliphatic hydrocarbon group which may contain an ethereal oxygen atom or a thioethereal sulfur atom,
   k is an integer of from 1 to 100,
   $A^1$ is a $C_{2-4}$ alkylene group having at least one hydrogen atom substituted by a hydrocarbon group which may contain an ethereal oxygen atom, provided that when k is from 2 to 100, a plurality of $A^1$ may be the same or different, and $R^1$ is a hydrogen atom, a $C_{1\text{-}18}$ hydrocarbon group or a $C_{1\text{-}18}$ acyl group.

10. An additive for concrete, comprising:

at least one fluorine-containing compound of formula (I)

$$R^f\text{—}Q^1\text{—}O\text{—}(A^1\text{—}O)_k\text{—}R^1 \qquad (1),$$

wherein $R^f$ is a $C_{1\text{-}22}$ polyfluoroaliphatic hydrocarbon group which may contain an ethereal oxygen atom or a thioethereal sulfur atom, $Q^1$ is a $C_{1\text{-}15}$ linear or branched alkylene group, k is an integer of from 1 to 100, $A^1$ is a $C_{2\text{-}4}$ alkylene group having at least one hydrogen atom substituted by a hydrocarbon group which may contain an ethereal oxygen atom, provided that when k is from 2 to 100, a plurality a $A^1$ may be the same or different, and $R^1$ is a hydrogen atom, a $C_{1\text{-}18}$ hydrocarbon group or a $C_{1\text{-}18}$ acyl group;

wherein said mixture has a ratio of the weight average molecular weight, $M_w$, to the number average molecular weight, $M_n$, of at least 1.1.

11. The additive according to claim 10, wherein $R^1$ is a hydrogen atom.

12. The additive according to claim 10, wherein $A^1$ is an ethylene group and/or a propylene group.

13. The additive according to claim 10, wherein $R^f$ is a $C_{4\text{-}22}$ perfluoroalkyl group.

14. The additive according to claim 10, wherein $A^1$ is an ethylene group and/or a propylene group.

15. The additive according to claim 10, wherein $R^f$ is a $C_{4\text{-}22}$ perfluoroalkyl group.

16. The additive according to claim 10, wherein $R^f$ is a $C_{4\text{-}22}$ perfluoroalkyl group.

* * * * *

UNITED STATES PATENT AND TRADEMARK OFFICE
CERTIFICATE OF CORRECTION

PATENT NO.    : 6,395,083 B2
DATED         : May 28, 2002
INVENTOR(S)   : Enna et al.

It is certified that error appears in the above-identified patent and that said Letters Patent is hereby corrected as shown below:

<u>Title page,</u>
Item [63], Related U.S. Application Data should read:
-- Related U.S. Application Data

[63]   Division of application No. 09/308,640, filed as application
       No. PCT/JP97/04335 on Nov. 27, 1997, now Pat. No. 6,340,779. --
Item [30], Foreign Application Priority Data has been omitted. It should read:
-- [30]            Foreign Application Priority Data

Nov. 28, 1996     (JP) ........................................ 8-318192 --

Signed and Sealed this

Twenty-ninth Day of October, 2002

Attest:

*Attesting Officer*

JAMES E. ROGAN
*Director of the United States Patent and Trademark Office*